United States Patent [19]

Blake

[11] 3,878,098

[45] Apr. 15, 1975

[54] ACTIVATOR SOLUTION CONTAINING COPPER (II) IONS, HALIDE AND A MILD OXIDIZING AGENT

[75] Inventor: Ralph Kingsley Blake, Westfield, N.J.

[73] Assignee: E. I. du Pont de Nemours and Company, Wilmington, Del.

[22] Filed: Nov. 15, 1972

[21] Appl. No.: 306,620

Related U.S. Application Data

[60] Division of Ser. No. 60,619, Aug. 3, 1970, Pat. No. 3,736,871, which is a continuation-in-part of Ser. No. 864,867, Oct. 8, 1969, abandoned.

[52] U.S. Cl....................... 252/186; 96/29 L; 96/33

[51] Int. Cl............................................ A61l 13/00

[58] Field of Search............... 96/33, 29 L; 252/186

[56] References Cited

UNITED STATES PATENTS

| | | | |
|---|---|---|---|
| 3,083,097 | 3/1963 | Lassig et al. | 96/33 |
| 3,257,941 | 6/1966 | Wolfson et al. | 96/29 L |
| 3,561,961 | 2/1971 | Blake | 96/33 |
| 3,625,687 | 12/1971 | Dunkle | 96/33 |
| 3,676,125 | 7/1972 | de Hanes et al. | 96/29 L |

*Primary Examiner*—David Klein

[57] ABSTRACT

A lithographic printing plate having an ink-receptive image comprising a hydrophilic colloid binder, an insoluble salt or complex of copper (I) with an oleophilogenic compound, and metallic silver is made by treating a hydrophilic colloid-silver image with an activator containing cupric ions and said oleophilogenic compound. Activators are aqueous solutions containing copper (II) ions and a halogen ion.

7 Claims, No Drawings

ACTIVATOR SOLUTION CONTAINING COPPER (II) IONS, HALIDE AND A MILD OXIDIZING AGENT

CROSS REFERENCE TO RELATED APPLICATIONS

This application is a division of application Ser. No. 60,619 filed Aug. 3, 1970, now U.S. Pat. No. 3,736,871 which is a continuation-in-part of application Ser. No. 864,867, filed Oct. 8, 1969, now abandoned.

An element useful in making images of the type disclosed in this application is described in Assignee's copending application by Blake, filed Aug. 4, 1969, Ser. No. 847,399, now U.S. Pat. No. 3,635,399, which also discloses activator solutions.

BACKGROUND OF THE INVENTION

This invention relates to lithographic printing plates and more particularly to improved colloid lithographic plates. Still more particularly it relates to lithographic images on colloid plates having improved quality and press life.

Methods of preparing lithographic images from gelatino-silver images are well known.

An exposed gelatino-silver halide emulsion layer may be treated with a tanning developer which hardens the gelatin in the imaged areas and makes it ink-receptive. In the bromoil process oleophilic hardened gelatin images are produced by treating a gelatino-silver image (produced by conventional photographic methods) with a tanning bleach which hardens the gelatin in the silver image areas of the layer but does not affect those portions of the gelatin layer having no silver. The silver in a gelatino-silver image may also be used to catalyze the oxidative degradation of the gelatin in the imaged areas so that it can be washed away to reveal an oleophilic underlayer.

Lassig, et al., U.S. Pat. No. 3,083,097 disclose a process for making a lithographic image from a gelatino-silver image by converting the silver image into an image of heavy metal and/or silver compounds and reacting these with sparingly soluble organic compounds containing —SH, —SeH, —OH, or —NH groups to form organic salt-like or complex compounds which are less soluble than the original products of oxidation. The presence of the organic salt-like or complex compounds makes the imaged areas oleophilic and therefore ink-receptive. In the Lassig, et al., process all of the superficial silver image is converted to a silver salt in the first step, then in a second step this silver salt is further reacted with a sparingly soluble organic compound to form the oleophilic image. Prior art processes are long and difficult and produce plates capable of printing relatively few copies before they are worn out. The lithographic images of this invention are easily preapred and are very durable so that they may be used to print many thousands of copies.

SUMMARY OF THE INVENTION

It is an object of this invention to prepare from colloido-silver halide emulsion layers more durable lithographic plates having improved image quality and longer press life. A further object is to prepare such plates by improved and simpler processes.

The improved lithographic images of this invention comprise a hydrophilic colloid binder capable of forming a complex with copper (I) ion, an insoluble complex or salt of copper (I) ion with an oleophilogenic compound and metallic silver.

The process for making lithographic images comprises exposing imagewise a photographic element comprising a support bearing a layer of a dispersion of light-sensitive silver halide in a macromolecular organic protein colloid binder; developing the exposed layer with a silver halide developing agent to form a silver image; treating the developed silver image with an aqueous solution containing a. a water-soluble, inorganic copper salt yielding copper (II) ions in a concentration of 0.01 molar to about 2.0 molar, b. a water-soluble, inorganic halide yielding a halogen ion forming a silver salt no more soluble in water than silver chloride in a concentration of 0.01 to 0.5 molar, to reduce copper (II) ions, the reduction being terminated before all superficial silver image is oxidized, characterized in that an oleophilogenic compound is present (1) at least when the element is treated with the aqueous solution or (2) after formation of copper (I) ions.

These lithographic images are simply and conveniently formed by treating a colloido-silver image with a solution comprising copper (II) ions and the sulfur- or nitrogen-containing organic compound until the metallic silver has reduced enough copper (II) ions to copper (I) ions, which form an insoluble complex with said oleophilogenic organic compound to make an ink-receptive image. This treatment should be discontinued before all of the superficial silver image has reacted with copper (II) so that the remaining silver can provide the metallic silver component of the lithographic image. This oleophilogenic compound can also be added after formation of copper (I) ions.

To obtain the lithographic images, activator solutions are used in the process. The activator solution comprises an aqueous solution having a pH of 0.5 to 6.0, preferably between 1 and 3, and contain a. copper (II) ions in a concentration of 0.01 molar to about 2.0 molar;

b. a water-soluble, inorganic halide yielding a halogen ion forming a silver salt no more soluble in water than silver chloride in a concentration of 0.01 to 0.5 molar;

and are characterized in that the activator contains at least one of the following 1. an oleophilogenic compound in a concentration of 0.1 to 10 grams or more per liter of the solution;
2. a mild oxidizing agent in a concentration such that the ratio of copper (II) to oxidizing agent is between 1 to 5 and 100 to 1.

Useful oleophilogenic compounds are described below. Suitable mild oxidizing agents which can be present in the activator, either in combination with the oleophilogenic compound or not, include, e.g., iron (III) ion, benzoquinone, mercury (II) chloride, in a concentration ratio of copper (II) ion of from about 5/1 to 1/100, preferably from 3/1 to 1/30. Such oxidizing agents have been found to reduce or prevent background scum on the plates.

Citric acid and other complexing agents may be used to control available copper (II) ion concentration. Other adjuvants such as 1,2,3-triphenyl guanidine and cyanoguanidine may be added to the activator solution to give the plate a more rapid start-up capability.

The resulting lithographic plates start to print rapidly on the press, have a long press life (up to 30,000 copies or more).

DESCRIPTION OF THE PREFERRED EMBODIMENTS

The hydrophilic binder for the lithographic images is a stratum of a film-forming colloid-containing chemical groups capable of forming complexes or salts with copper (I) ions, thus binding them to said stratum. A preferred such binder is gelatin, although any hydrophilic binder capable of forming a strong complex or salt with copper (I) ions may be used, e.g., other macromolecular proteins, including casein and zein.

The binder preferably should form stronger complexes with copper (I) ions than with copper (II) ions. The binder should be hardened sufficiently so that none of the colloid is transferred to the printed surface.

The copper (I) ions which are distributed imagewise in the ink-receptive portions of the lithographic image may be produced by any appropriate means for generating an image of copper (I) ions. A copper (I) solution may be applied mechanically as with a pen or a gravure printing press. A particularly preferred method of producing a copper (I) ion image is to generate copper (I) ions by imagewise reduction of copper (II) ions using a metallic silver image as the reducing agent. This may be done by treating the colloido-silver image with an aqueous solution of copper (II) ions in a concentration of 0.01 to 2.0 moles per liter, and a suitable anion, e.g., a halide forming a silver salt no more soluble in water than silver chloride, in a concentration of from about 0.01 to about 0.5 molar, preferably between 0.01 and 0.1 molar.

The metallic silver component of the image is required for a long-lived lithographic image. In the absence of metallic silver the lithographic image deteriorates fairly rapidly. A preferred method of producing the metallic silver in intimate association with the copper (I) ion image is to produce said image by using a metallic silver image to reduce copper (II) ions, stopping the process before all of the superficial silver image is oxidized. This may be achieved by stopping the reduction while at least some silver image is still visible.

The olephiliogenic compound used in this invention is a compound which forms an insoluble salt or complex with copper (I) ions and an appreciably more soluble complex or salt with copper (II) ions and at the same time imparts an oleophilic character to the hydrophilic colloid binder. Usually the molecules of such compounds will have an oleophilic moiety and a copper-complexing or salt-forming moiety. The copper-complexing or salt-forming moiety frequently is comprised of one or more nitrogen, sulfur or oxygen atoms. The oleophilic moiety may be a hydrocarbon residue. Generally speaking, the more soluble the compound is in water, the more effective it will be, for larger concentrations of the molecules will be available to react with the copper (I) ions. The organic compounds preferably contain at least two hetero atoms to be effective in making an oleophilic, ink-receptive image. Nitrogen-containing compounds are usually the most effective but compounds containing sulfur and oxygen may also be used. Particularly preferred compounds are substituted organic indoles, diazoles, triazoles, and tetrazoles. Representative operative compounds are potassium thiocyanate, benzotriazole, 2-mercaptothiazoline, 6-nitrobenzimidazole, 3-amino-1,2,4-triazole, tannic acid, potassium hexacyanoferrate (II), and potassium hexacyanoferrate (III).

In practicing a preferred embodiment of this invention a conventional photographic gelatino-silver halide emulsion is exposed to actinic radiation through a process transparency, then developed in a conventional silver halide latent image developer to produce a metallic silver image. The developed image is then bathed for 5 to 90 seconds in a bath comprising copper (II) chloride or bromide at a concentration of between 0.05 and 0.5 mole per liter, citric acid at a concentration of 0.01 to 0.25 mole per liter, and benzotriazole at a concentration of 0.1 to 10 grams per liter. The treatment should be stopped before all the superficial silver image is oxidized. After this treatment, the lithographic plate is placed on a press, inked with lithographic ink and used to print offset or direct negative lithographic copies of the original.

The following examples will illustrate the practice of this invention but are not intended to limit its scope.

EXAMPLE I

An ortho-sensitized gelatino-silver chlorobromide emulsion having a 70/30 mole per cent bromide/chloride ratio and containing 111 g of gelatin per mole of silver halide was coated at a coating weight of 88 mg/dm$^2$ of silver halide on a polyethylene terephthalate film base prepared as described in Example IV of Alles, U.S. Pat. No. 2,779,684. The dried emulsion was then overcoated with a gelatin antiabrasion layer at a coating weight of 2.5 mg/dm$^2$ of gelatin. A sample of this element was exposed for 10 seconds through a negative halftone and line original with a No. 2 RFL photoflood operated at 22 volts at a distance of 2 feet. The exposed sample was developed in a conventional high pH p-methylaminophenol/hydroquinone developer for 30 seconds at 70°F, bathed in 2 per cent acetic acid for 15 seconds, then bathed for 30 seconds in a bleach at a pH of 2 to 6 prepared according to the folowing procedure.

Solutions A and B were prepared:

| | |
|---|---|
| Solution A | |
| 3 molar potassium bromide (aqueous) | 100 ml |
| 3 molar copper (II) nitrate (aqueous) | 100 ml |
| 1 molar potassium citrate (aqueous) | 50 ml |
| Water to make | 1000 ml |
| Solution B | |
| Benzotriazole solution (1 g/20 ml of ethanol) | 10 ml |
| Water | 990 ml |

Solution B was added to Solution A. The plate was then rubbed with a conventional gum-asphaltum-emulsion used commercially for treating lithographic plates, inked with black offset litho ink using a swab moistened with 2 per cent acetic acid, mounted or an offset office duplicator (A.B.Dick) and used to print several hundred offset copies on bond paper using 2 per cent acetic acid as the fountain solution.

EXAMPLE II

Samples of the element of Example I were developed 15 seconds at 75°F in a conventional high pH 1-phenyl-3-pyrazolidone/hydroquinone developer in white light, bathed 15 seconds in 2 percent acetic acid, and bleached 30 seconds in a bleach having the following composition:

| | |
|---|---|
| 3 molar potassium bromide (aqueous) | 100 ml |
| 3 molar copper (II) nitrate (aqueous) | 50 ml |
| Water | 850 ml |

The bleached strips were bathed 30 seconds in test solutions of the various compounds listed in Table I rubbed with black litho ink using a swab moistened with a working fountain solution prepared as follows.

| | |
|---|---|
| Stock Fountain Solution: | |
| 3 molar orthophosphoric acid | 10 ml |
| 0.5 molar trisodium phosphate | 25 ml |
| Water to make | 1000 ml |
| Working Fountain Solution: | |
| Stock fountain solution | 20 ml |
| Gum Arabic (1 g/100 ml water) | 20 ml |
| Diethylene glycol monobutyl ether | 50 ml |
| Water to make | 1000 ml |

Other samples were tested using a swab moistened with 2 percent acetic acid. The test solutions were prepared by diluting 5 ml of a concentrated solution of the chosen compound with 95 ml of water. Results of the ink acceptance test are tabulated in Table I following Example III.

EXAMPLE III

A sample of the element of Example I was exposed through the base in contact with a halftone negative transparency for 10 seconds to a No. 2 RFL photoflood operating at 20 volts at a distance of 2 feet. The exposed sample was developed 1 minute in a conventional high pH p-methylaminophenol/hydroquinone developer, water-washed 5 minutes then bathed 2 minutes in the following solution to make a lithographic printing plate.

| | |
|---|---|
| 3 molar copper (II) nitrate (aqueous) | 5 ml |
| Glacial acetic acid | 1 ml |
| 3 molar sodium chloride (aqueous) | 5 ml |
| 1 molar potassium acetate (aqueous) | 10 ml |
| Potassium thiocyanate (0.1 g/ml aqueous solution) | 4 ml |
| Water | 65 ml |
| 0.3% aqueous colloidal silica sol containing about 30% silica | 10 ml |
| Water | 100 ml |

Offset lithographic copies on bond paper were printed on an office duplicator (A.B.Dick) using 1 percent acetic acid as the fountain solution.

TABLE I

| | CONCENTRATED SOLUTION | | INK ACCEPTANCE | |
|---|---|---|---|---|
| COMPOUND | SOLVENT | AMOUNT | 2% ACETIC ACID | FOUNTAIN SOLUTION OF EX. II |
| Benzotriazole | Ethanol | 1 g/100 ml | Yes | Yes |
| 3,5-dimethyl-1,2,4-triazole | ″ | ″ | Yes | No |
| 6-nitroquinoline | ″ | ″ | Yes | No |
| 2-mercaptobenzimidazole | ″ | ″ | Yes | No |
| 5-nitrobenzotriazole | ″ | ″ | Yes | Yes |
| 2-mercaptobenzoxazole | ″ | ″ | Yes | No |
| thioglycolic acid | ″ | ″ | Yes | No |
| thiobarbituric acid | ″ | ″ | Yes | Yes |
| 1,2-naphthotriazole | ″ | ″ | Yes | No |
| 2-mercaptobenzothiazole | ″ | ″ | Yes | No |
| 6-nitrobenzimidazole nitrate | ″ | ″ | Yes | Yes |
| phenolphthalein | ″ | ″ | Yes | No |
| 2-mercaptoethanol | ″ | ″ | Yes | No |
| 2-mercaptothiazoline | ″ | ″ | Yes | Yes |
| 2-mercapto-4-phenylthiazole | ″ | ″ | Yes | No |
| 1-phenyl-5-mercaptotetrazole | ″ | ″ | Yes | No |
| 3-ethylrhodanine | ″ | ″ | Yes | No |
| tolutriazole | ″ | ″ | Yes | Yes |
| 4-phenylcatechol | ″ | ″ | Yes | No |
| 2-chlorobenzothiazole | ″ | ″ | Yes | No |
| thiosalicylic acid | ″ | ″ | Yes | No |
| tetrachlorohydroquinone | ″ | | Yes | No |
| 2-amino-6-methylbenzothiazole | | ″ | | |
| 3-amino-1,2,4-triazole | Ethanol | 1 g/100 ml | Yes | Yes |
| potassium hexacyanoferrate (II) | Water | ″ | Yes | Yes |
| potassium hexacyanoferrate (III) | ″ | ″ | Yes | Yes |
| guanidine thiocyanate | ″ | ″ | Yes | Yes |
| Congo red | ″ | ″ | Yes | No |
| sodium thiosulfate | ″ | ″ | Yes | No |
| potassium thiocyanate | ″ | ″ | Yes | Yes |
| 5-aminotetrazole monohydrate | ″ | ″ | Yes | Yes |
| methyl-7-hydroxy-1,2,3-triazole-indolizine | 0.26N NaOH | 5.2 g/100 ml | Yes | No |
| 6-nitroindazole | 20% ethanol/ 0.2N NaOH | 1 g/100 ml | Yes | No |

TABLE I – Continued

| COMPOUND | CONCENTRATED SOLUTION SOLVENT | CONCENTRATED SOLUTION AMOUNT | INK ACCEPTANCE 2% ACETIC ACID | INK ACCEPTANCE FOUNTAIN SOLUTION OF EX. II |
|---|---|---|---|---|
| 5-nitroindazole | " | " | Yes | No |
| guanine | 0.2N NaOH | 1 g/200 ml | Yes | Yes |
| ethylenethiourea | 50% ethanol/ water | 1 g/100 ml | Yes | Yes |
| hypoxanthine | 0.007N NaOH | 1 g/100 ml | Yes | No |
| 3-chloro-6-nitro-indazole | Ethanol | " | Yes | No |
| hexamethylene-tetramine | Water | " | Yes | No |
| phenylisothiocyanate | Ethanol | " | Yes | No |
| 2,4,5-triphenyl-imidazole | " | " | Yes | No |
| 2-guanidinobenz-imidazole | " | " | Yes | No |
| 2-aminobenzimidazole | " | " | Yes | No |
| ω,ω'-bispiperidine methyl urea | Water | 1 g/100 ml | Yes | No |
| pentamethylene-tetrazole | Ethanol | " | Yes | No |
| DL-β-phenylalanine | 1% acetic acid | " | Yes | No |
| histamine dihydro-chloride | Water | " | Yes | No |
| L-histidine | " | " | Yes | No |
| 1,10-phenanthroline | Ethanol | " | Yes | No |
| dihydroxynonano-phenone | " | " | Yes | No |
| 1,2,3-triphenyl-guanidine | " | " | Yes | No |
| 1-phenyl-2-methyl benzimidazole | " | 1 g/1000 ml | Yes | No |
| 2-methyl-1,3-diethyl benzimidazole iodide | " | " | Yes | No |
| 1-phenyl-3-ethyl-2-[3-ethylbenzo-thiazole-propylidino]benz-imidazolium iodide | " | " | Yes | No |
| 3,1'-disulfopropyl-5-methyl-2-benzo-thiazole-2-quinoline cyanine | " | 1 g/500 ml | Yes | No |
| Remazol Brilliant Blue (C.I. Reactive blue 19) | Water | 1 g/100 ml | Yes | No |
| Stilbene Yellow (C.I. Direct Yellow 11) | " | " | Yes | No |
| Condensation product of sodium bisulfite and a polyacrolein resin of molecular weight 400,000. (Carbon to sulfur atomic ratio = 6) | Water | 1 g/100 ml | Yes | No |
| tannic acid | " | " | Yes | Yes |

EXAMPLE IV

A sample of the element of Example I was imagewise exposed, developed for 1 minute in a conventional high pH 1-phenyl-3-pyrazolidinone/hydroquinone developer, bathed 15 seconds in 2 percent acetic acid solution, then treated for 30 seconds in an activator of the following composition:

| | |
|---|---|
| 3 molar copper (II) nitrate (aqueous) | 10 ml |
| 3 molar potassium bromide (aqueous) | 10 ml |
| 1 molar orthophosphoric acid | 5 ml |
| Potassium thiocyanate (0.1 g/ml aqueous solution) | 4 ml |
| Sodium nitrite (50 g/liter aqueous solution) | 5 ml |
| Water | 71 ml |

The sample was rubbed with lithographic ink using a moistened swab. The imaged portion of the sample accepted ink.

EXAMPLE V

A sample of the element of Example I was partially immersed in a conventional high pH p-methylaminophenol/hydroquinone developer for 30 seconds at 68°F, with white room lights turned on. Excess developer was removed by squeegeeing and the sample was bathed 15 seconds in an activator prepared according to the following procedure. Solutions A and B were prepared.

| | |
|---|---|
| Solution A | |
| 3 molar citric acid (aqueous) | 20 ml |
| 3 molar tartaric acid (aqueous) | 20 ml |
| Benzotriazole solution (1 g/100 ml of ethanol) | 20 ml |
| Water | 40 ml |
| Solution B | |
| 3 molar potassium bromide (aqueous) | 10 ml |
| 3 molar copper (II) nitrate (aqueous) | 5 ml |
| Water | 85 ml |
| Solution B was added to Solution A. | |

The treated sample was then squeegeed lightly against the emulsion side of another sample of the element of Example I and held in contact for 45 seconds. The strips were separated and the undevloped strip was rubbed with lithographic ink using a cotton swab moistened with 2 percent acetic acid. The part of the receptor layer which had been in contact with the developed portion of the first strip accepted ink.

EXAMPLE VI

A gelatino-silver image on a polyethylene terephthalate support prepared by conventional photographic methods from the element of Example I was treated in an aqueous copper (II) bromide solution for 10 seconds, then placed in contact with a sample of the element of Example I, also wet with the bleach solution, for 10 seconds, and then separated. The receptor layer was bathed in an aqueous benzotriazole solution for 10 seconds and rubbed with lithographic ink using a cotton swab moistened with 2 percent acetic acid. The receptor layer was found to have an ink receptive image.

EXAMPLE VII

A hardened gelatin receptor layer on a polyethylene terephthalate support was prepared by fixing, washing, and drying an undeveloped sample of the element of Example I. Example VI was repeated using this receptor layer in place of the gelatino-silver chlorobromide receptor of that example. An ink-receptive image was obtained on the receptor layer.

EXAMPLE VIII

A photographic high speed x-ray type gelatino-silver iodobromide emulsion having a 3/97 mole percent iodide to bromide ratio and containing 120 g of gelatin per mole of silver halide was coated at a coating weight of 110 mg/dm$^2$ of silver halide on the subbed polyethylene terephthalate support of Example I. The dried emulsion was overcoated with a gelatin antiabrasion layer having 10 mg/dm$^2$ of gelatin. Example V was repeated using this element as the photosensitive layer. An ink-receptive image was obtained on the receptor layer.

EXAMPLE IX

A sample of the element of Example I was imagewise exposed, developed, and fixed by conventional photographic techniques. The resulting gelatino-silver image and a sample of the element of Example I were bathed for 10 seconds in a solution of the following composition.

| | |
|---|---|
| 3 molar copper (II) nitrate (aqueous) | 5 ml |
| 3 molar potassium bromide (aqueous) | 10 ml |
| 3 molar citric acid (aqueous) | 10 ml |
| Water | 75 ml |

The bathed strips were placed in contact for 20 seconds and separated. The receptor was bathed for 15 seconds in a solution of the following composition.

| | |
|---|---|
| Benzotriazole (1 g/100 ml of alcohol) | 10 ml |
| 3 molar citric acid (aqueous) | 10 ml |
| Water | 80 ml |

The receptor was then rubbed with lithographic ink using a cotton swab moistened with 2% acetic acid containing a small amount of gum arabic. A black ink image appeared on the receptor layer.

EXAMPLE X

A hardened gelatin receptor layer on a polyethylene terephthalate support was prepared as in Example VII. Example IX was repeated using this receptor layer in place of the gelatino-silver chlorobromide receptor of that example. A black ink image was obtained on the receptor.

EXAMPLE XI

A sample of hardened gelatin on a polyethylene terephthalate support prepared as in Example VII was soaked for about 30 seconds in a cupric bromide solution, then soaked for about 30 seconds in a benzotriazole solution to which a small amount of sodium nitrite has been added. The treated sample was then rubbed with lithographic ink using a swab moistened with 2 percent acetic acid. The gelatin was found to be ink-receptive.

EXAMPLE XII

A sample of the element of Example I was exposed and processed as in Example I using instead of the bleach of Example I a bleach of the following composition.

| | |
|---|---|
| Glacial acetic acid | 100 ml |
| Benzotriazole (1 g/100 ml of alcohol) | 100 ml |
| 1 molar potassium citrate (aqueous) | 100 ml |
| 3 molar potassium bromide (aqueous) | 50 ml |
| 3 molar copper (II) nitrate trihydrate (aqueous) | 25 ml |
| 1 molar iron (III) nitrate nonahydrate (aqueous) | 25 ml |
| 1,2,3-triphenyl guanidine (1 g/100 ml of alcohol) | 50 ml |
| Water to make | 1000 ml |

The plate when used as in Example I gave good offset copies free of background scum.

EXAMPLE XIII

A high speed ortho-sensitized gelatino-silver iodobromide emulsion having about 1.2% silver iodide and containing about 120 g of gelatin per mole of silver halide was coated on an 0.008 inch waterproof, polyethylene coated, photographic base at a coating weight of 27 mg/dm² of silver bromide and overcoated with 10 mg/dm² of gelatin hardened with 4 g of formaldehyde per 100 g of gelatin.

A sample of this element was exposed on a phototypesetting machine in which each character was separately exposed using a xenon flash tube source having a flash duration of 2 to 3 microseconds and an energy output of 100 millijoules. The exposed sample was tray developed for 30 seconds in a conventional high pH 1-phenyl-3-pyrazolidone/hydroquinone developer containing 0.25 g of benzotriazole per liter, water washed for 30 seconds, and treated for 30 seconds in an activator of the following composition:

| | |
|---|---|
| Glacial acetic acid | 100 ml |
| Benzotriazole solution (1 g/100 ml of ethanol) | 100 ml |
| 1 molar potassium citrate (aqueous) | 100 ml |
| 0.6 molar potassium bromide (aqueous) | 250 ml |
| 0.3 molar copper (II) nitrate (aqueous) | 250 ml |
| Water to make | 1000 ml |

The treated sample was then washed with water for 30 seconds and rubbed with a conventional commercial plate treating asphaltum-gum emulsion. The plate was then placed on an offset office duplicating machine (A.B.Dick) and used to print 30,000 copies using a fountain solution prepared as follows.

| | |
|---|---|
| Stock Fountain Solution | |
| 3 molar phosphoric acid | 10 ml |
| 0.5 molar trisodium phosphate (aqueous) | 25 ml |
| Water to make | 1000 ml |
| Working Fountain Solution | |
| Stock fountain solution | 20 ml |
| Benzotriazole solution (1 g/100 ml of ethanol) | 10 ml |
| Gum arabic (1 g/100 ml of water) | 20 ml |
| Diethylene glycol monobutyl ether | 50 ml |
| Water to make | 1000 ml |
| All copies showed good quality offset images. | |

EXAMPLE XIV

A high-speed ortho-sensitized aqueous gelatino-silver iodobromide emulsion was coated at 25 mg equivalent $AgBr/dm^2$ on polyethylene coated, gelatin subbed, waterproof paper base under low intensity red safelights. A gelatin antiabrasion layer containing formaldehyde hardener was coated over the wet emulsion layer at 15 mg/dm² and the two layers dried. A 25.4 × 38.1 cm sample of the paper coating was soaked for 1 minute at 22°C. in 1000 ml of water containing 10 g benzotriazole and 1.5 g of the sodium salt of p-tert-octylphenoxydiethyleneglycol sulfonic acid. After air drying, the sample was exposed through a test pattern in a vacuum frame to a k&m, 100-watt, 20-volt tungsten filament point source incandescent lamp at 114.3 cm for 9 seconds at tap setting 2 (16 volts) and through a glass Wratten (Registered Trademark) 18A UV filter plus a 0.6 neutral density filter. The exposed sample was processed at 22°C. for 40 seconds in a 4-tray processor, e.g., on Agfa-Gevaert Fotorite (Registered Trademark) model DD1437 stabilization paper processor using a conventional high pH 1-phenyl-3-pyrazolidone/hydroquinone developer in the first three trays and Solution A in tray 4. Solution A is as follows:

| Solution A | |
|---|---|
| 3M KBr | 50 ml |
| 3M $Cu(NO_3)_2.3H_2O$ | 5 ml |
| 3M Citric Acid | 50 ml |
| 1M $Fe(NO_3)_3.9H_2O$ | 50 ml |
| 1-Cyanoguanidine (1 g/100 ml $H_2O$) | 50 ml |
| Triphenyl Guanidine (1 g/100 ml ethanol) | 50 ml |
| Water up to | 1000 ml |
| pH 1.10 | |

The processed sample was then placed on a duplicating machine, e.g., an A. B. Dick 320 Office Duplicator, and using Fountain Solution B 25 good offset copies were made using a black lithographic ink. Fountain Solution B is:

| | |
|---|---|
| Stock Fountain Solution Described in Example II pH 3.9 | 20 ml |
| Gum Arabic (1 g/100 ml $H_2O$) | 20 ml |
| Diethylene glycol mono-n-butyl ether | 50 ml |
| Water to make | 1000 ml |
| pH 3.90 | |

A similarly exposed and processed sample of the same paper emulsion coating which had not been bathed in the benzotriazole solution would not accept ink or give printed offset copies.

EXAMPLE XV

An ortho-sensitized gelatino-silver chlorobromide emulsion having a 70/30 mole percent bromide/chloride ratio and containing 111 g of gelatin per mole of silver halide was coated at a coating weight of 88 mg/dm² of silver halide on a polyethylene terephthalate support described in Example I. The dried emulsion was overcoated with a gelatin antiabrasion layer at a coating weight of 2.5 mg/dm² of gelatin hardened with 4.25 g of dimethylolurea per 100 g of gelatin. The prepared photographic film was exposed through a halftone and line test negative for 6 seconds with a 500-watt RSP-2 reflector photospot lamp having a tungsten filament operated at 15 volts at a distance of 127 cm. The exposed photographic film was developed for 30 seconds in the developer solution of Example XIV, except that the developer contained 2 g/liter of benzotriazole, and then activated for 30 seconds at 20°C. in an aqueous bath of the folowing composition.

| | |
|---|---|
| 3 molar cupric nitrate solution | 5 ml |
| 3 molar citric acid solution | 10 ml |
| 3 molar potassium bromide solution | 10 ml |
| Water | 75 ml |

The activated film was rinsed in water for 5 seconds, mounted, e.g., on an offset office duplicating machine, and using 2% by weight acetic acid as the fountain solution and a lithographic ink good quality negative oleophilic lithographic images were obtained. When a developer was used without any benzotriazole present no oleophilic lithographic image was formed.

EXAMPLE XVI

A high-speed, ortho-sensitized gelatino silver iodobromide emulsion having 1.2 mole percent silver iodide and a gelatin to silver halide ratio of 0.36 was coated at a coating weight of 7.2 milligrams of silver bromide per square decimeter on a polyethylene terephthalate photographic film base. The emulsion was overcoated with an antiabrasion layer comprising 10 milligrams per square decimeter of gelatin hardened with 2.96 g of formaldehyde and 11.25 g of dimethylolurea per 100 g of gelatin. The element was overcoated by skim coating at 38°C. and 2.74 m per minute with a nickel (II) hexacyanoferrate (II) sol prepared as follows:

| | |
|---|---|
| Solution A | |
| Water | 800 ml |
| Nickel (II) nitrate hexahydrate | 0.75 g |
| Potassium citrate monohydrate | 0.61 g |
| Solution B | |
| Water | 190 ml |
| Potassium hexacyanoferrate (II) trihydrate | 1.06 g |
| Sodium octyl phenoxy ethoxysulfonate (4.2% aqueous solution) | 10 ml |

Solution A was added to Solution B with vigorous stirring. The sol overcoat was then dried with a current of hot air.

The element was exposed through a step wedge and line image transparency for 10 seconds with the K&M light source described in Example XIV at a distance of 127 cm using an ultra violet filter and a neutral density filter of 0.6 optical density. The exposed element was developed for 20 seconds at 22°C. in a conventional high pH hydroquinone/1-phenyl-3-pyrazolidone developer containing 0.25 g of benzotriazole per liter, rinsed in water for 5 seconds, and then activated for 30 seconds at 22°C. in an aqueous bath of the following composition:

| | |
|---|---|
| 3 molar copper (II) nitrate | 25 ml |
| 3 molar potassium bromide | 25 ml |
| 3 molar citric acid | 100 ml |
| Benzotriazole | 0.25 g |
| Water to make | 1000 ml |
| pH adjusted to 2.0 | |

The plate was then rubbed with a 1% aqueous dispersion of colloidal silica and used on an office duplicator to pring offset copies using a lithographic ink and a fountain solution prepared as follows:

A fountain solution concentrate was prepared having the following composition:

| | |
|---|---|
| 3 molar aqueous orthophosphoric acid solution | 10 ml |
| 0.5 molar aqueous trisodium phosphate solution | 25 ml |
| Water to make | 1000 ml |

The fountain solution was then prepared from the concentrate according to the following formula:

| | |
|---|---|
| Fountain solution concentrate | 20 ml |
| Gum arabic solution (1 g/100 ml water) | 20 ml |
| Diethylene glycol monobutyl ether | 50 ml |
| Water to make | 1000 ml |

Satisfactory lithographic images were obtained.

EXAMPLE XVII

A nickel (II) hexacyanoferrate (II) sol was prepared as follows:

| | |
|---|---|
| Solution A | |
| 0.1 molar potassium citrate (aqueous) | 20 ml |
| 0.1 molar nickel (II) nitrate (aqueous) | 10 ml |
| Water | 170 ml |

-Continued

| | |
|---|---|
| Solution B | |
| 0.1 molar potassium hexacyanoferrate (II) | 30 ml |
| Partial sodium salt of N-lauryl beta iminodipropionate (1 g/100 ml of alcohol) | 4 ml |
| Water | 166 ml |

Solution A was added to Solution B in 15 seconds with rapid stirring.

A high-speed, ortho-sensitized gelatino-silver iodobromide emulsion having about 1.2% silver iodide and containing about 120 g of gelatin per mole of silver halide, coated at a coating weight of about 25 mg/dm$^2$ on a smooth, polyethylene coated, photographic paper base was overcoated with the sol by skim coating at a speed of 2.44 m per minute and hot air drying.

Two samples were exposed through a step wedge and line image transparency for 10 seconds with a K&M, 100-watt, 20-volt tungsten point source incandescent lamp at tap setting 2 (16 volts) at a distance of 127 cm using an ultra-violet filter and a neutral density filter of 0.6 optical density. The exposed samples were developed for 30 seconds at 22°C. in a conventional high pH hydroquinone/1-phenyl-3-pyrazolidone developer containing 0.25 g of benzotriazole per liter. One sample was activated for 8 seconds in the following activator solution:

| | |
|---|---|
| 3 molar copper (II) nitrate | 16.3 ml |
| 3 molar potassium bromide | 15.5 ml |
| 3 molar citric acid | 100.0 ml |
| Benzoquinone | 0.79 g |
| Water to make | 1000 ml |

The second sample was activated for 8 seconds in the following activator solution:

| | |
|---|---|
| 3 molar copper (II) nitrate | 25 ml |
| 3 molar potassium bromide | 25 ml |
| 3 molar citric acid | 100 ml |
| 0.2 molar mercury (II) chloride | 50 ml |
| Water to make | 1000 ml |

Each activated sample was dried by hot air and used on an office duplicator to print good offset copies using a lithographic ink and fountain solution described in Example XVI.

EXAMPLE XVIII

Element A is a high-speed ortho-sensitized aqueous gelatino-silver iodobromide emulsion which was coated at 25 mg equivalent AgBr/dm$^2$ on polyethylene-coated, gelatin-subbed, waterproof paper base under low intensity red safelights. A gelatin antiabrasion layer containing formaldehyde hardener was coated over the wet emulsion layer at 15 mg/dm$^2$ and the two layers dried. Element B consists of Element A overcoated by skim coating at 38°C. and 2.74 m per minute using a nickel (II) hexacyanoferrate (II) sol prepared as follows:

| | |
|---|---|
| Solution A | |
| Water | 800 ml |
| Nickel (II) nitrate hexahydrate | 0.75 g |
| Potassium citrate monohydrate | 0.61 g |
| Solution B | |
| Water | 190 ml |
| Potassium hexacyanoferrate (II) trihydrate | 1.06 g |
| Sodium octyl phenoxy ethoxysulfonate (4.2% aqueous solution) | 10 ml |

Solution A was added to Solution B with vigorous stirring. The sol overcoat was then dried with a current of hot air.

Element A was exposed and processed as described in Example XIV. Processed Element A was rewet with Solution A described in Example XIV and squeeged in contact with Element B for 30 seconds at 22°C. The elements were separated and Element B was then placed on an offset office duplicating machine and, usng Fountain Solution B in Example XIV and a lithographic ink, 10 copies were prepared.

This example was repeated except that prior to the exposure and processing of Element A in the above procedure, both Elements A and B were soaked in a 0.01 molar solution of potassium ferrocyanide for two minutes. Excess solution was drained from the elements and the elements were air dried. Up to 500 offset images were obtained during the printing operation.

The lithographic images of this invention are more easily and rapidly prepared than those used hitherto. Lithographic plates using these images start to print more rapidly, have longer life, and greater resistance to aging than other plates prepared from gelatino-silver halide emulsion layers.

The embodiments of the invention in which an exclusive property or privilege is claimed are defined as follows:

1. An activator solution comprising an aqueous solution having a pH of 0.5 – 6.0 containing a. copper (II) ions in a concentration of 0.01 molar to about 2.0 molar;

b. a water-soluble, inorganic halide yielding a halogen ion forming a silver salt no more soluble in water than silver chloride in a concentration of 0.01 to 0.5 molar;

characterized in that the activator contains an oleophilogenic compound in a concentration of 0.1 to 10 grams or more per liter of solution.

2. An activator solution according to claim 1, characterized in that the oleophiligenic compound is benzotriazole.

3. An activator solution according to claim 1, containing ferric nitrate.

4. An activator solution according to claim 1, containing benzoquinone.

5. An activator solution according to claim 1, containing mercury (II) chloride.

6. An activator solution according to preceding claim 1, characterized in that the inorganic halide is potassium bromide.

7. An activator solution according to preceding claim 1, characterized in that citric acid is present at a concentration of 0.01 to 0.25 mole per liter of solution.

* * * * *